(12) United States Patent
Lee

(10) Patent No.: US 9,985,489 B2
(45) Date of Patent: May 29, 2018

(54) SEPARATED COOLANT CIRCULATION STRUCTURE FOR WATER-COOLED POWER GENERATOR AND COOLING METHOD THEREOF

(71) Applicant: DOOSAN HEAVY INDUSTRIES & CONSTRUCTION CO., LTD., Changwon-si, Gyeongsangnam-do (KR)

(72) Inventor: Hakjae Lee, Changwon-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 562 days.

(21) Appl. No.: 14/629,070

(22) Filed: Feb. 23, 2015

(65) Prior Publication Data
US 2015/0244223 A1 Aug. 27, 2015

(30) Foreign Application Priority Data
Feb. 21, 2014 (KR) .................. 10-2014-0020686

(51) Int. Cl.
| H02K 9/00 | (2006.01) |
| H02K 3/51 | (2006.01) |
| H02K 3/24 | (2006.01) |
| H02K 9/19 | (2006.01) |
| H02K 3/22 | (2006.01) |

(52) U.S. Cl.
CPC .............. H02K 3/24 (2013.01); H02K 3/22 (2013.01); H02K 9/19 (2013.01)

(58) Field of Classification Search
CPC .................. H02K 3/22; H02K 9/005

USPC ................ 310/52, 54, 58, 59, 260, 270
See application file for complete search history.

(56) References Cited

U.S. PATENT DOCUMENTS

| 3,112,415 | A | * | 11/1963 | Bahn | .................. | H02K 3/22 310/54 |
| 3,963,950 | A | | 6/1976 | Watanabe et al. | | |
| 4,172,984 | A | * | 10/1979 | Daugherty | ............. | H02K 5/225 310/65 |
| 4,602,177 | A | | 7/1986 | Eckels et al. | | |
| 6,943,469 | B2 | | 9/2005 | Nelson | | |
| 7,994,668 | B2 | | 8/2011 | Gerstler et al. | | |

(Continued)

FOREIGN PATENT DOCUMENTS

| FR | 1195551 A | 11/1959 |
| JP | 57110046 A | 7/1982 |

(Continued)

OTHER PUBLICATIONS

Office Action dated Dec. 14, 2016 issued by the State Intellectual Property Office in counterpart Chinese Patent Application No. 201510083818.9.

(Continued)

*Primary Examiner* — Jose Gonzales Quinones
(74) *Attorney, Agent, or Firm* — Sughrue Mion, PLLC

(57) ABSTRACT

A separated coolant circulation structure for a water-cooled power generator includes a cooling circulation channel for a stator bar to cool heat of a stator bar winding, and a cooling circulation channel for a connector ring to heat of a connector ring, wherein the cooling circulation channel for the stator bar and the cooling circulation channel for the connector ring form separate coolant supply paths to improve cooling efficiency and reduce a pump load.

20 Claims, 17 Drawing Sheets

(56) References Cited

U.S. PATENT DOCUMENTS

2002/0079773 A1  6/2002  Butman et al.
2011/0241458 A1  10/2011 Rai et al.

FOREIGN PATENT DOCUMENTS

| JP | 59117433 A | | 6/1984 | |
|----|------------|---|--------|---|
| JP | 61081151 A | * | 4/1986 | ............... H02K 3/22 |
| JP | 63077337 A | | 4/1988 | |
| JP | 10215534 A | | 8/1998 | |
| JP | 2011223866 A | | 4/2011 | |
| KR | 10-2006-0125053 A | | 12/2006 | |
| KR | 10-2006-0135945 A | | 12/2006 | |
| KR | 10-2009-0012165 A | | 2/2009 | |

OTHER PUBLICATIONS

Guillard, J. M et al. "300 MW Modular Design Generators." Alsthom Review. Jan. 1987 pp. 19-30, No. 7.
Hanita, A et al. "Technical Overview Through Development of the Largest Scale Turbine-Generator Model with Full Water Cooling." IEEE Transactions on Power Apparatus and Systems, IEEE Inc., Jul. 1984, pp. 1801-1808 vol. PAS-103, No. 7.
Communication dated Apr. 21, 2016 from the European Patent Office in counterpart application No. 15155894.7.
Communication dated Feb. 23, 2016 from the Japanese Patent Office in counterpart application No. 2015-031503.

* cited by examiner

Cooling of stator winding

Cooling of connector ring

Step A:

From coolant supply ring for collector end to stator cooling channel

Step B:

From stator inner channel to coolant discharge ring for turbine end

Step C :

From coolant supply ring for collector end to connector ring outer channel

Step D :

From connector ring outer channel to coolant discharge ring for collector end

SEPARATED COOLANT CIRCULATION STRUCTURE FOR WATER-COOLED POWER GENERATOR AND COOLING METHOD THEREOF

CROSS-REFERENCE TO RELATED APPLICATIONS

This application claims priority to Korean Patent Application No. 10-2014-0020686, filed Feb. 21, 2014, the disclosure of which is incorporated herein by reference in its entirety.

BACKGROUND

Field

Apparatuses and methods consistent with exemplary embodiments relate to a water-cooled power generator, and more specifically, to a separated coolant circulation structure for a water-cooled power generator in which a connector ring cooling circulation unit and a stator bar cooling circulation unit are separated so that a coolant is separately fed thereto, thereby improving the cooling efficiency of the high-capacity water-cooled generator.

Background of the Related Art

Usually, a high-capacity power generator (about 350 MW or more) employs a water-cooled armature winding, in which hollow wires are designed to have a hollow structure along a cooling path 1 within the armature (stator bar 100), as illustrated in FIGS. 1a and 1b, and a coolant flows in the hollow wires to cool the armature.

In the coolant circulation structure for the water-cooled power generator according to the related art, as illustrated in FIG. 1a, a cooling path 10 of the coolant extends from an upper winding at a turbine end B via a collector end A to a lower winding at the turbine end A. In the drawing, the arrow indicates a flow direction of the coolant.

According to the coolant circulation structure for the water-cooled power generator according to the related art, however, since the coolant which is primarily cooled while passing through the upper winding (flowing from the B side to the A side) is returned to the lower winding (flowing from the A side to the B side), the length of the cooling path 1 is prolonged, and thus the cooling efficiency is decreased.

If the length of the cooling path 1 is prolonged, as described above, there is a problem in that since a pressure loss across an inlet and an outlet of the coolant is increased, a pump load is usually increased for the purpose of the smooth flow of the coolant.

For reference, if the hollow wires, through which the coolant flows, are designed to be large so as to decrease the above-described pressure loss, the effective cross sectional area of copper forming the armature winding is decreased, thereby leading to a loss in electrical resistance.

In order to solve the above problems, Korean Patent No. 0695608, assigned to the applicant, is disclosed.

Korean Patent No. 0695608 solves the problems of the decreased cooling efficiency and the increased pump load of the related art, as illustrated in FIG. 1b, in which since the coolant is fed to a collector end E, divided into an upper winding 2 and a lower winding 3, and then discharged from turbine ends C and D, the cooling path is shortened to improve the cooling efficiency, and the pressure loss across the inlet and the outlet of the coolant is decreased to reduce the pump load.

However, Korean Patent No. 0695608 does not specifically disclose a cooling structure for a connector ring which is provided in the cooling path and has a high heating value. Although not shown in FIG. 2, the related art cools the connector ring by extending an upper line and a lower line of the collector end side to cool the stator bar 100 and the connector ring at the same time. However, since the stator bar and the connector ring are simultaneously cooled by the same lines, the cooling path is prolonged, and thus the problems of the decreased cooling efficiency and the increased pump load are not completely solved.

SUMMARY

Accordingly, in view of the above-mentioned problems, one or more exemplary embodiments provide a separated coolant circulation structure for a water-cooled power generator in which a connector ring cooling circulation unit and a stator bar cooling circulation unit are separated so that a coolant is separately fed thereto, thereby improving the cooling efficiency of the high-capacity water-cooled generator and reducing a pump load.

In order to achieve the above object, the separated coolant circulation structure for a water-cooled power generator may include a cooling circulation channel for a stator bar to cool heat of a stator bar winding; and a cooling circulation channel for a connector ring to heat of a connector ring, wherein the cooling circulation channel for the stator bar and the cooling circulation channel for the connector ring form separate coolant supply paths to improve cooling efficiency and reduce a pump load.

The cooling circulation channel for the stator bar may include an annular coolant supply ring for a collector end which is connected to a coolant inlet pipe, through which a coolant flows; a stator inner channel for supplying the coolant to the stator winding, of which an inlet terminal positioned at a collector end side is connected to the coolant supply ring for the collector end; and an annular coolant discharge ring for a turbine end that is connected to an outlet terminal of a turbine end side of the stator inner channel.

The stator inner channel includes a pair of an upper channel passing an upper winding and a lower channel passing a lower winding, and the upper channel and the lower channel respectively form a flow of the coolant in the same direction from the collector end side to the turbine end side.

The cooling circulation channel for the connector ring may include the coolant supply ring for the collector end, a connector ring outer channel for annually enclosing a circumference of the connector ring, of which an inlet terminal is connected to the coolant supply ring for the collector end to receive the coolant, and an annular coolant discharge ring for the collector end that is connected to an outlet terminal of the connector ring outer channel.

An inlet terminal of the stator inner channel is connected to the coolant supply ring for the collector end by at least one of a first set of coupling hoses, an inlet terminal of the connector ring outer channel is connected to the coolant supply ring for the collector end by at least one of a second set of coupling hoses, and an outer terminal end of the connector ring outer channel is connected to the coolant discharge ring for the collector end by at least one of a third set of coupling hoses.

The first set of coupling hoses may include at least one first coupling hose, of which one end is connected to the coolant supply ring for the collector end to receive the coolant, and the other end is branched into a first outlet port and a second outlet port, and the first outlet port and the second outlet port are respectively connected to the lower channel and the upper channel to feed the coolant into the lower and upper channels.

The first set of coupling hoses may include at least one fourth coupling hose, of which one end is connected to the coolant supply ring for the collector end to receive the coolant, and the other end is branched into a first outlet port and a second outlet port, and the first outlet port and the second outlet port are respectively connected to the lower channel and the upper channel to feed the coolant into the lower and upper channels.

The first set of coupling hoses may include at least one third coupling hose, the second set of coupling hoses may include at least one second coupling hose, the third coupling hose and the second coupling hose are connected to the coolant supply ring for the collector end at each end to receive the coolant, the coolant fed through the third coupling hose is supplied to the lower channel, and the coolant fed through the second coupling hose is supplied to the connector ring outer channel.

The first set of coupling hoses may include at least one sixth coupling hose, the second set of coupling hoses may include at least one fifth coupling hose, the fifth coupling hose and the sixth coupling hose are connected to the coolant supply ring for the collector end at each end to receive the coolant, the coolant fed through the sixth coupling hose is supplied to the upper channel, and the coolant fed through the fifth coupling hose is supplied to the connector ring outer channel.

The first set of coupling hoses may include at least one third coupling hose; the third set of coupling hoses may include at least one seventh coupling hose; one end of the third coupling hose is connected to the coolant supply ring for the collector end to receive the coolant from the coolant supply ring for the collector end, and the other end is connected to the lower channel to supply the coolant to the lower channel; and one end of the seventh coupling hose is connected to the outlet terminal of the connector ring outer channel to receive the coolant from the connector ring outer channel, and the other end is connected to the coolant discharge ring for the collector end to discharge the coolant to the coolant discharge ring for the collector end.

The first set of coupling hoses may include at least one sixth coupling hose; the third set of coupling hoses may include at least one eighth coupling hose; one end of the eighth coupling hose is connected to the coolant supply ring for the collector end to receive the coolant from the coolant supply ring for the collector end, and the other end is connected to the upper channel to supply the coolant to the upper channel; and one end of the eighth coupling hose is connected to the outlet terminal of the connector ring outer channel to receive the coolant from the connector ring outer channel, and the other end is connected to the coolant discharge ring for the collector end to discharge the coolant to the coolant discharge ring for the collector end.

The connector ring outer channel is provided in plural in such a way that some portions are formed in an annularly cut shape, thereby enclosing the circumference of the connector ring, each of inlet terminals of the connector ring outer channels is connected to coolant supply ring for the collector end by the second set of coupling hose to receive the coolant, and each of outlet terminals is connected to the coolant discharge ring for the collector end by the third set of coupling hose to discharge the coolant.

An outlet terminal of the stator inner channel at the turbine end side of the upper and lower channels may be connected to the coolant discharge ring for the turbine end by the plurality of ninth coupling hoses, one end of the ninth coupling hose is divided to a first inlet port and a second inlet port which receive the coolant from the upper and lower channels, respectively, and the other end is connected to the coolant discharge ring for the turbine end in the shape of a single outlet to discharge the coolant.

Meanwhile, a method of separately cooling a water-cooled power generator according to one embodiment includes the steps of: cooling heat of a stator winding by a cooling circulation channel for the stator winding; cooling heat of a connector ring by a cooling circulation channel for the connector ring, wherein the step of cooling the stator winding and the step of cooling the connector ring are carried out by each coolant supply path formed by the cooling circulation channel for the connector ring and the cooling circulation channel for the stator winding which are separately provided, thereby improving cooling efficiency and reducing a pump load.

The step of cooling the stator wiring may include a step A of supplying a coolant from a coolant supply ring for a collector end to an inlet terminal of the collector end in a stator inner channel in a stator bar, and a step B of discharging the coolant from an outlet terminal of a turbine end in the stator inner channel to an annular coolant discharge ring for a turbine end.

The step of cooling the connector ring may include a step C of supplying the coolant from the coolant supply ring for the collector end to an inlet terminal of a connector ring outer channel which annually encloses the circumference of the connector ring, and a step D of discharging the coolant from the outlet terminal of the connector ring outer channel to the coolant discharge ring for the collector end.

In the step A, the coolant is supplied from the coolant supply ring for the collector end to a pair of an upper channel passing through an upper winding and a lower channel passing through a lower winding, and the upper channel and the lower channel form a flow of the coolant in the same direction from the collector end to the turbine end.

In the step A, the coolant is supplied from the coolant supply ring for the collector end via at least one of first set of coupling hoses to the inlet terminal of the stator inner channel, in the step C, the coolant is supplied from the coolant supply ring for the collector end via at least one of second set of coupling hoses to the inlet terminal of the connector ring outer channel, and in the step D, the coolant is discharged from the outlet terminal of the connector ring outer channel via at least one of third set of coupling hoses to the coolant discharge ring for the collector end.

In the step A, the coolant is supplied from the coolant supply ring for the collector end to one end of at least one first coupling hose of the first set of coupling hoses, and then is supplied to each of the upper channel and the lower channel through the other end of the first coupling hose which is divided into a first outlet port and a second outlet port.

In the step A, the coolant is supplied from the coolant supply ring for the collector end to one end of at least one fourth coupling hose of the first set of coupling hoses, and then is supplied to each of the upper channel and the lower channel through the other end of the fourth coupling hose which is divided into a first outlet port and a second outlet port.

In the step A, the coolant fed from the coolant supply ring for the collector end through at least one third coupling hose of the first set of coupling hoses is supplied to the lower channel, and in the step C, the coolant is supplied from the coolant supply ring for the collector end through at least one second coupling hose of the second set of coupling hoses to the connector ring outer channel.

In the step A, the coolant fed from the coolant supply ring for the collector end through at least one sixth coupling hose of the first set of coupling hoses is supplied to the upper channel, and in the step C, the coolant is supplied from the coolant supply ring for the collector end through at least one fifth coupling hose of the second set of coupling hoses to the connector ring outer channel.

In the step A, the coolant fed from the coolant supply ring for the collector end through at least one third coupling hose of the first set of coupling hoses is supplied to the lower channel, and in the step D, the coolant is discharged from the discharge terminal of the connector ring outer channel through at least one seventh coupling hose of the third set of coupling hoses to the coolant discharge ring for the collector end.

In the step A, the coolant fed from the coolant supply ring for the collector end through at least one sixth coupling hose of the first set of coupling hoses is supplied to the upper channel, and in the step D, the coolant is discharged from the discharge terminal of the connector ring outer channel through at least one eighth coupling hose of the third set of coupling hoses to the coolant discharge ring for the collector end.

In the step B, the coolant fed is discharged from the coolant discharge ring for the turbine end through the plurality of ninth coupling hoses which are connected to the outlet terminals of the upper and lower channels of the stator inner channel. One end of the ninth coupling hose is divided into the first inlet port and the second inlet port to receive the coolant from the upper channel and the lower channel, and the other end is connected to the coolant discharge ring for the turbine end to discharge the coolant.

According to the embodiment, the connector ring cooling circulation channel for cooling the connector ring and the stator bar cooling circulation channel for cooling the stator bar winding are configured to have the separated coolant supply path, so that the cooling path is shortened, thereby remarkably improving the cooling efficiency and reducing the pump load.

DETAILED DESCRIPTION

Figure 1A:
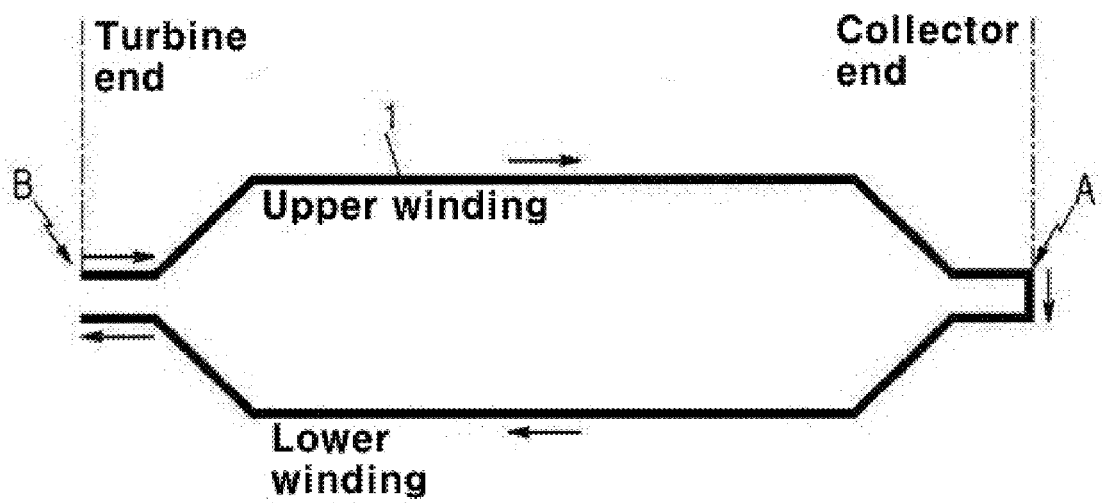
FIG. 1a is a schematic view illustrating a cooling circulation structure for a power generator according to one example of the related art.
Figure 1B:
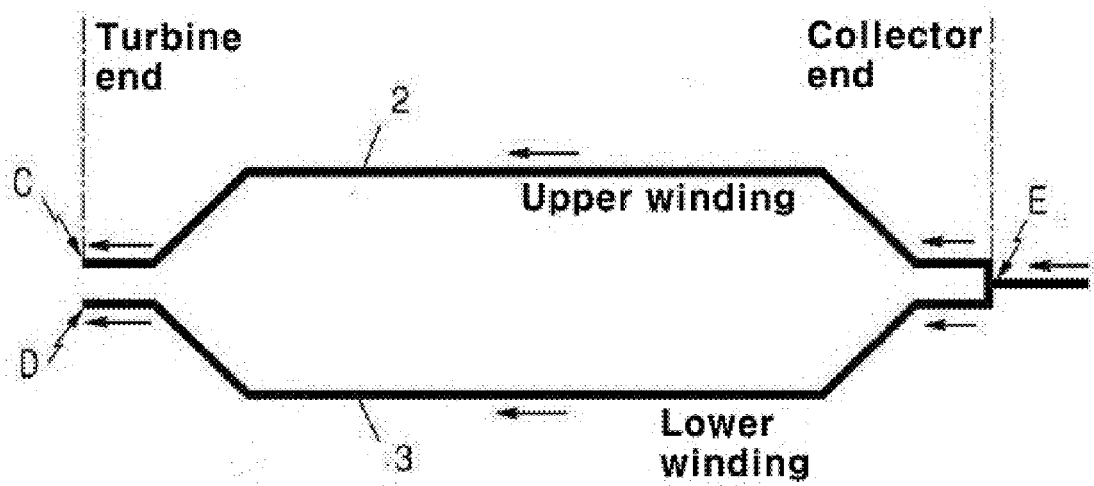
FIG. 1b is a schematic view illustrating a cooling circulation structure for a power generator according to the other example of the related art.

Hereinafter, embodiments will be described in detail with reference to the accompanying drawings. In describing the embodiments, the same reference numerals are used throughout the drawings to refer to the same elements, and redundant description thereof will omitted if necessary.

In addition, the expressions that mean ordinal numbers in the specification, such as "first," "second," "A," "B," "(a)," "(b)," and the like, are used for describing various constituent elements without imposing any limitation to the various constituent elements. The expressions that mean the ordinal numbers are used only for distinguishing among the constituent elements of the same kind. When one element is described as being "connected" or "coupled" to the other element, it should be understood that one element may be directly connected or coupled to the other element, but a third element may be interposed between the two elements. In contrast, when one element is described as being "directly connected" or "directly coupled" to the other element, it should be understood that a third element is not interposed between the two elements.

The separated coolant circulation structure for the water-cooled power generator provides that a connector ring cooling circulation unit and a stator bar cooling circulation unit are separated to form separate coolant supply paths, thereby improving the cooling efficiency of the high-capacity water-cooled generator and reducing a pump load.

Specifically, a cooling circulation channel for the armature winding cools the heat of the armature winding by use of a coolant flowing therein, while a cooling circulation channel for the connector ring cools the heat of the connector ring by use of a coolant flowing therein.

Figure 12:
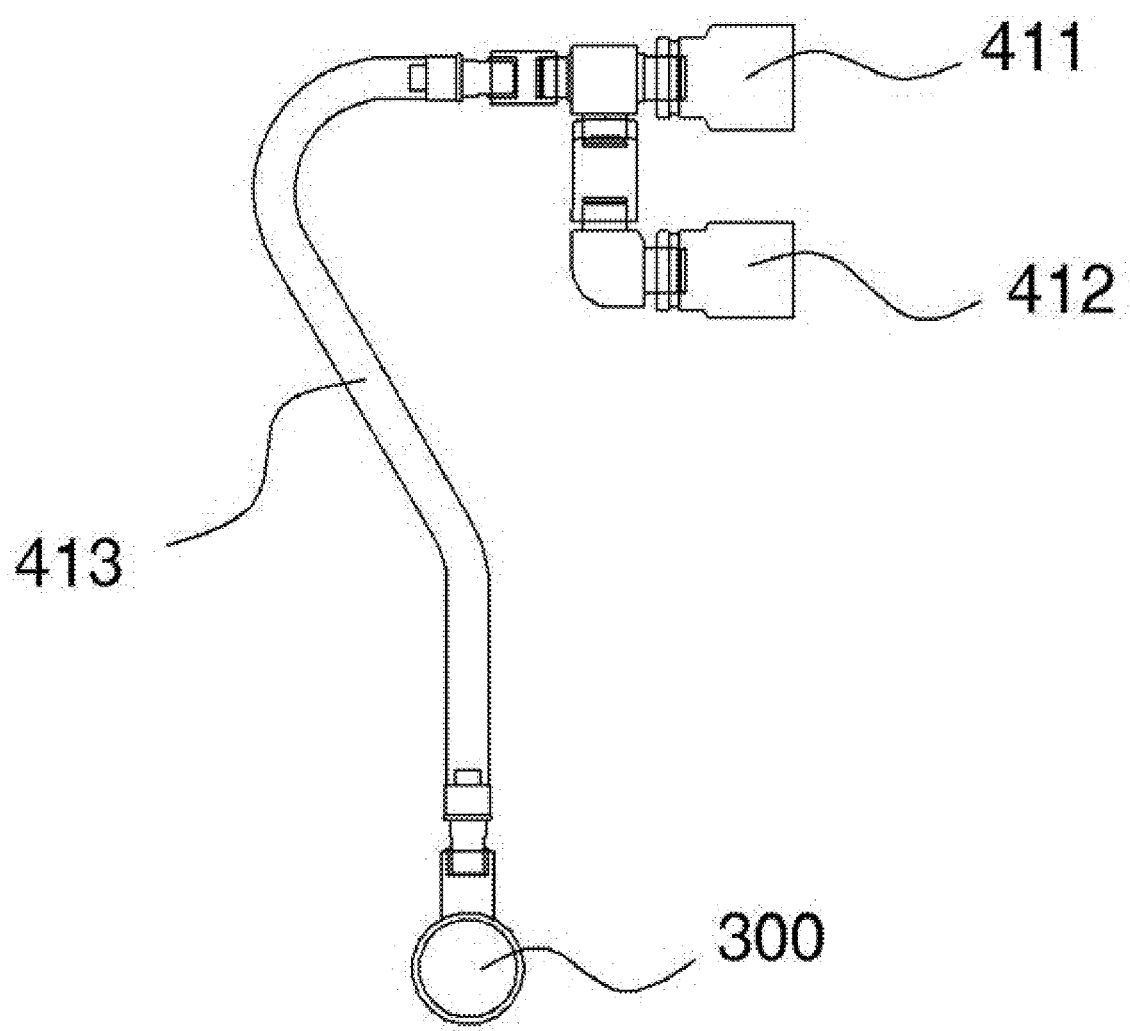
FIG. 12 is a plan view of a ninth coupling hose applied to the cooling circulation structure according to the embodiment.
Figure 13:
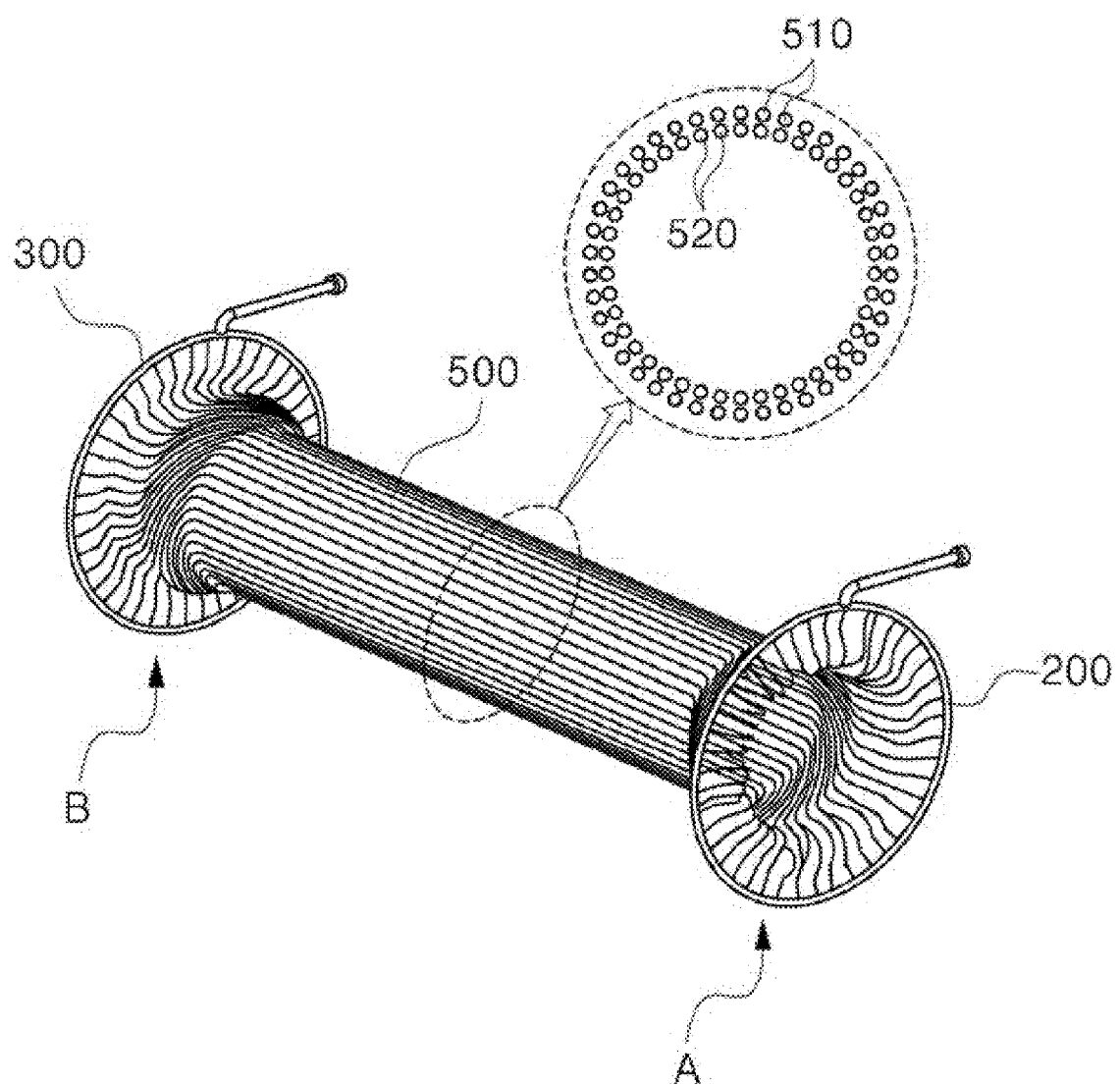
FIG. 13 is a schematic view illustrating cooling circulation of a stator bar according to the embodiment.
Figure 14:
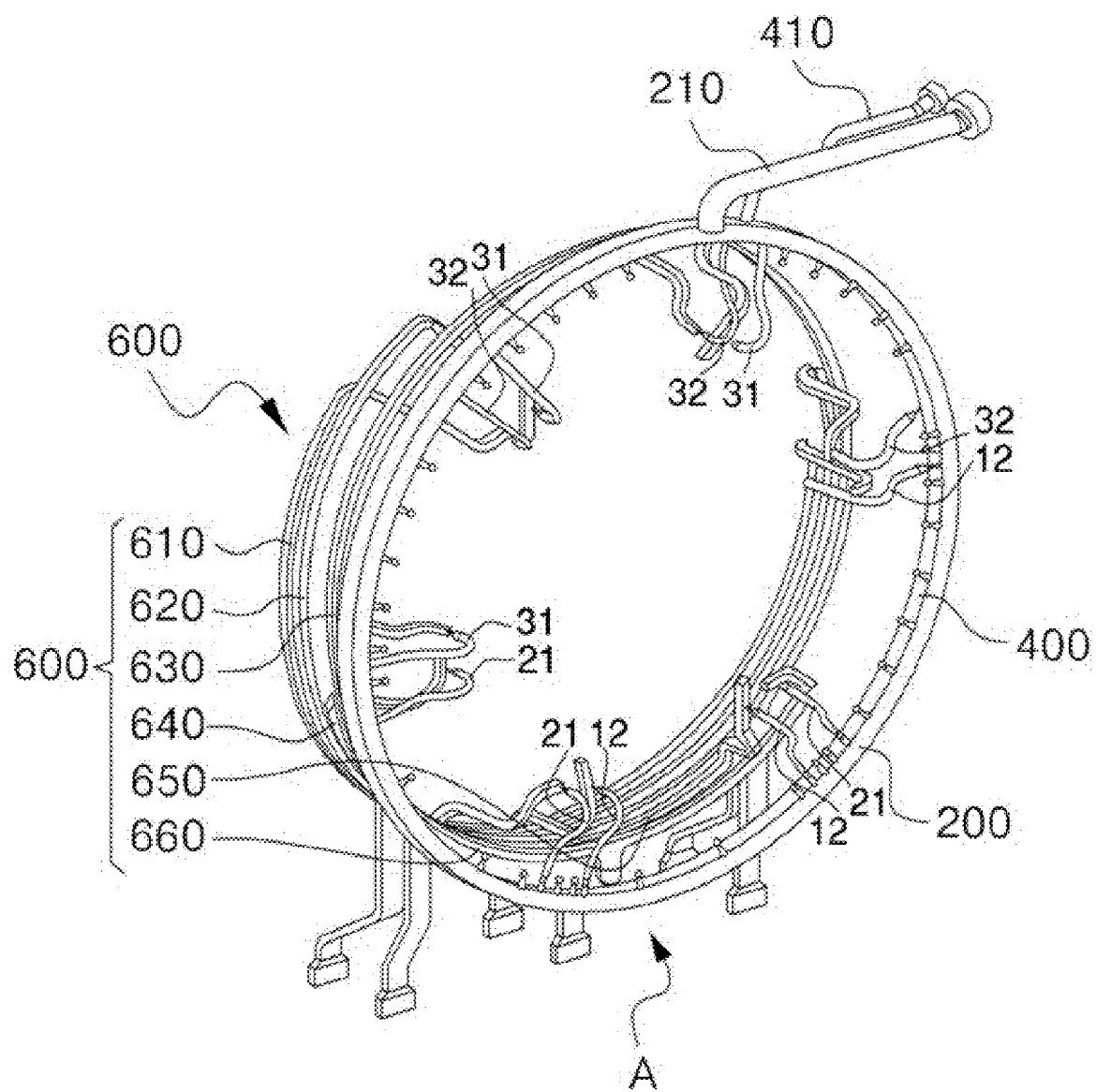
FIG. 14 is a schematic view illustrating cooling circulation of a connector ring according to the embodiment.

FIG. 13 is a perspective view schematically illustrating the cooling circulation channel for the stator bar 100. FIG. 14 is a perspective view schematically illustrating the cooling circulation channel for the connector ring. Hereinafter, the contents shown in FIGS. 2 to 12 will be described in detail with reference to FIGS. 13 and 14.

Figure 2:
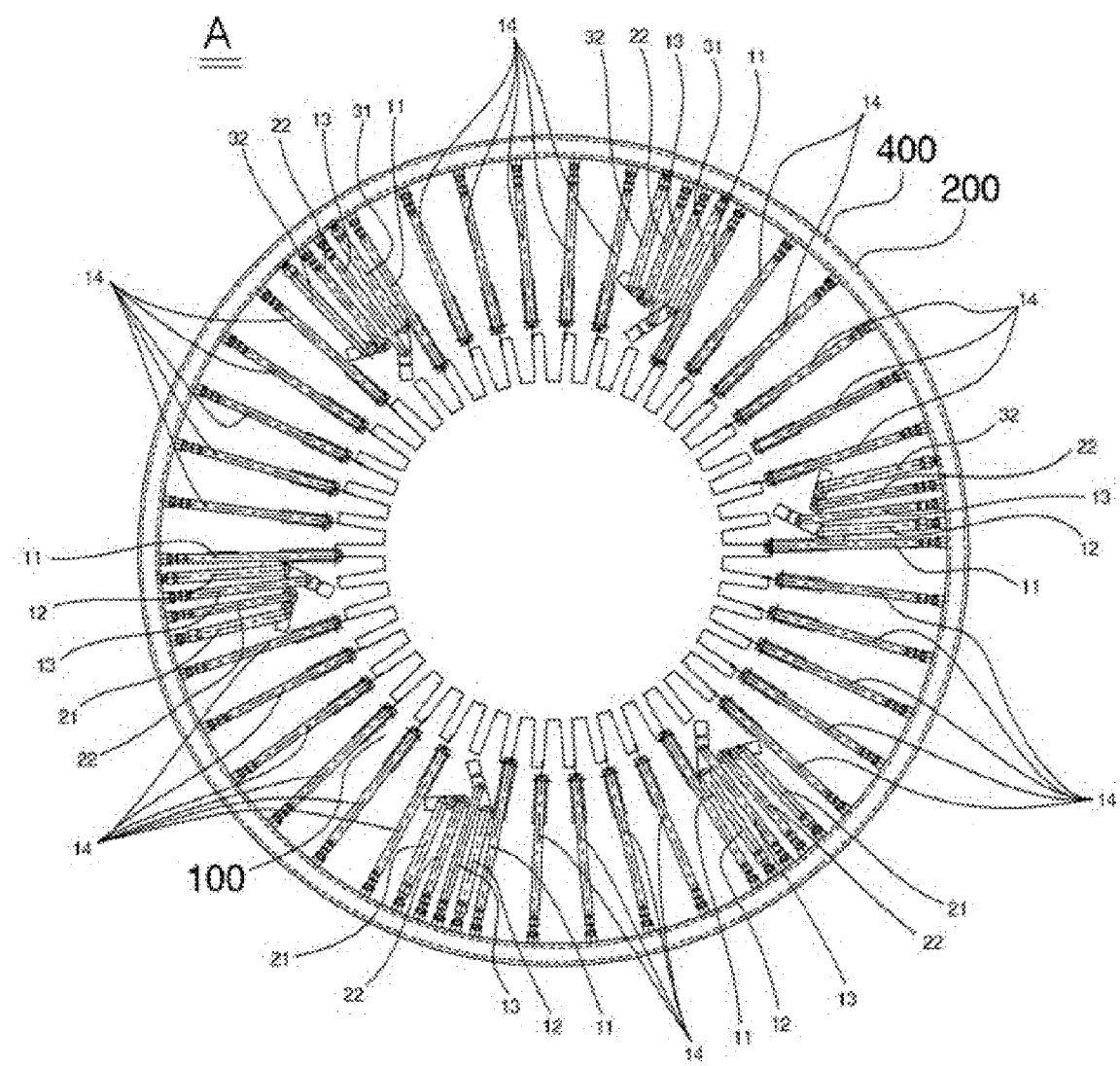
FIG. 2 is a cross-sectional view of a collector end side applied to a cooling circulation structure according to one embodiment.
Figure 3:
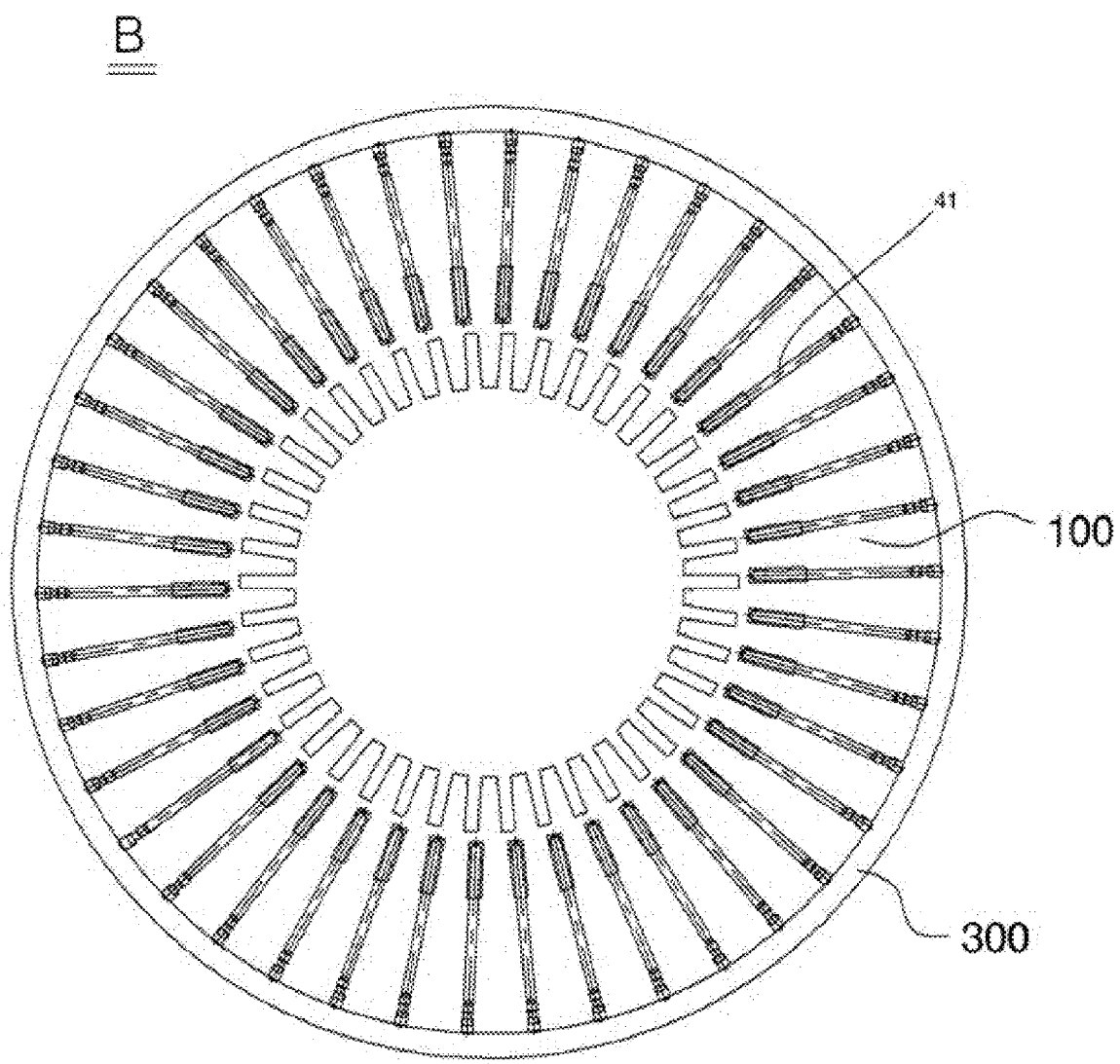
FIG. 3 is a cross-sectional view of a turbine end side applied to the cooling circulation structure according to the embodiment.

FIG. 2 is a cross-sectional view of a collector end side applied to the cooling circulation structure according to an embodiment. FIG. 3 is a cross-sectional view of a turbine end side.

The cooling circulation channel for the armature winding begins from a collector end A.

As illustrated in FIG. 2, the coolant is fed to an annular coolant supply ring 200 for the collector end through a coolant inlet pipe 210.

The coolant supply ring 200 for the collector end is configured to feed the coolant to a plurality of coupling hoses, i.e., first set of coupling hoses and second set of coupling hoses. Each of the first set of coupling hoses connects the coolant supply ring 200 for the collector end and a stator inner channel 500 to feed the coolant to the stator inner channel 500.

In FIG. 2, the number of coupling hoses including first to eighth coupling hoses is 54 in total, and the coupling hoses may be divided to first set of coupling hoses 11, 13, 14, and 22, second set of coupling hoses 12 and 21, and third set of coupling hoses 31 and 32.

The first set of coupling hoses 11, 13, 14, and 22 connect an inlet terminal of the stator inner channel 500 and the coolant supply ring 200 for the collector end.

The second set of coupling hoses 12 and 21 connect an inlet terminal of a connector ring outer channel 600 and the coolant supply ring 200 for the collector end.

Finally, the third set of coupling hoses 31 and 32 connect an outlet terminal of the connector ring outer channel 600 and a coolant discharge ring 400 for the collector end.

The portion in the coolant supply ring 200 for the collector end represented by a dotted line in FIG. 2 indicates the coolant discharge ring 400 for the collector end, and the portion represented by the dotted line is positioned at a rear when seen from the front of FIG. 2.

As illustrated in FIG. 13, the stator inner channel 500 includes a pair of channels, i.e., an upper channel 510 passing through an upper winding, and a lower channel 520 passing through a lower winding.

The upper channel 510 and the lower channel 520 are separated to form a flow of the coolant in the same direction from the collector end to a turbine end, so that the length of the respective cooling channels is shortened to reduce the pump load, and thus improve the cooling efficiency.

The connection relation among the upper channel 510 and the lower channel 520 which constitute the stator inner channel 500, the coolant supply ring 200 for the collector end, and the plurality of first set of coupling hoses 11, 13, 14, and 22 for connecting the above channels will be described in detail.

Figure 4:
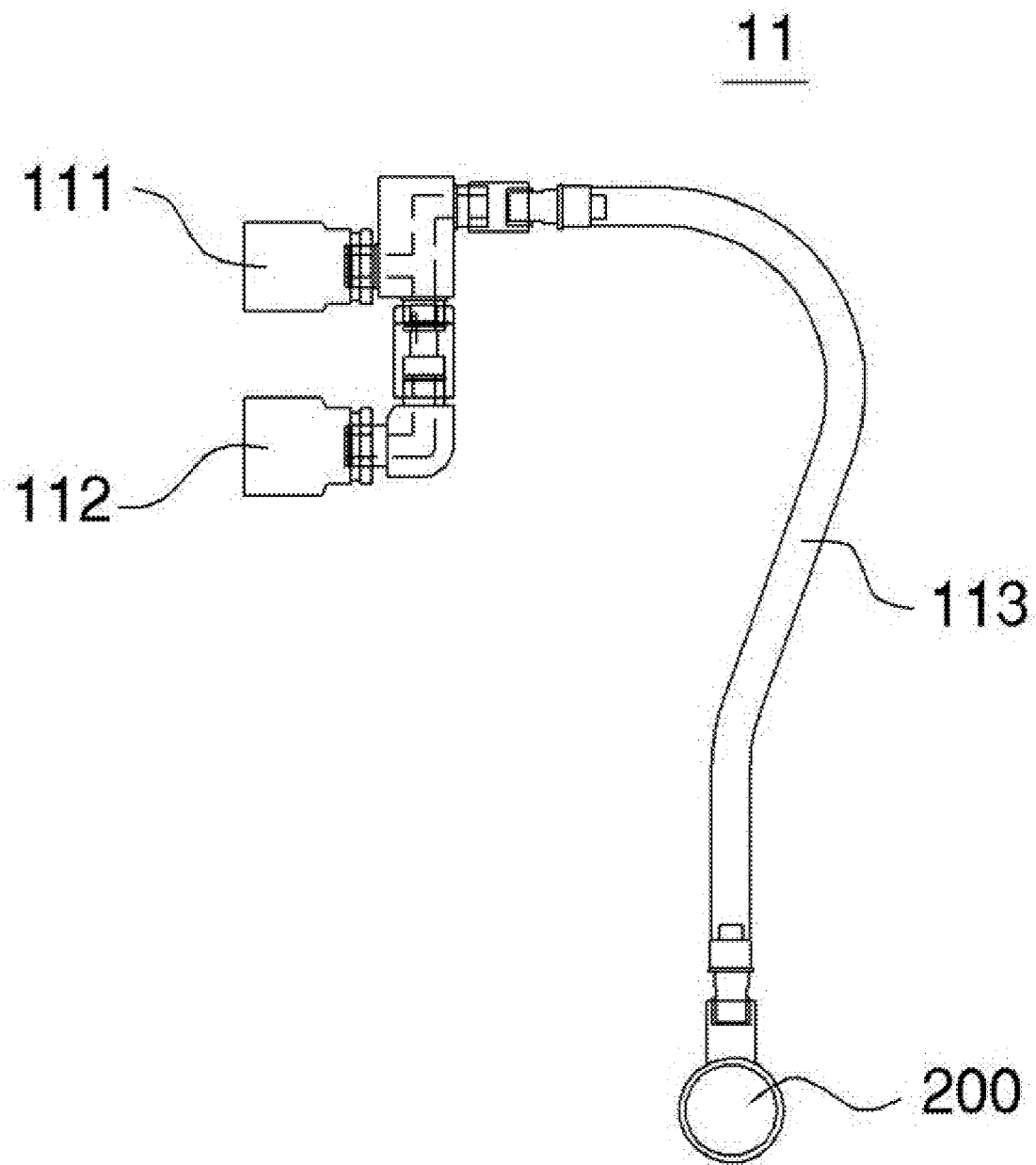
FIG. 4 is a plan view of a first coupling hose applied to the cooling circulation structure according to the embodiment.

FIG. 4 is a plan view of the first coupling hose according to an exemplary embodiment.

As illustrated in FIG. 4, one end of the first coupling hose 11 is connected to the coolant supply ring 200 for the collector end to feed the coolant into a hose portion 113. The other end is branched into a first outlet port 111 and a second outlet port 112.

The first outlet port 111 is connected to the lower channel 520 to feed the coolant into the lower channel 520, and the second outlet port 112 is connected to the upper channel 510 to feed the coolant into the upper channel 510.

The upper channel 510 corresponds to a channel formed at the outside in a circumferential direction in FIG. 13, and the lower channel 520 corresponds to a channel formed at the inside in the circumferential direction.

Figure 5:
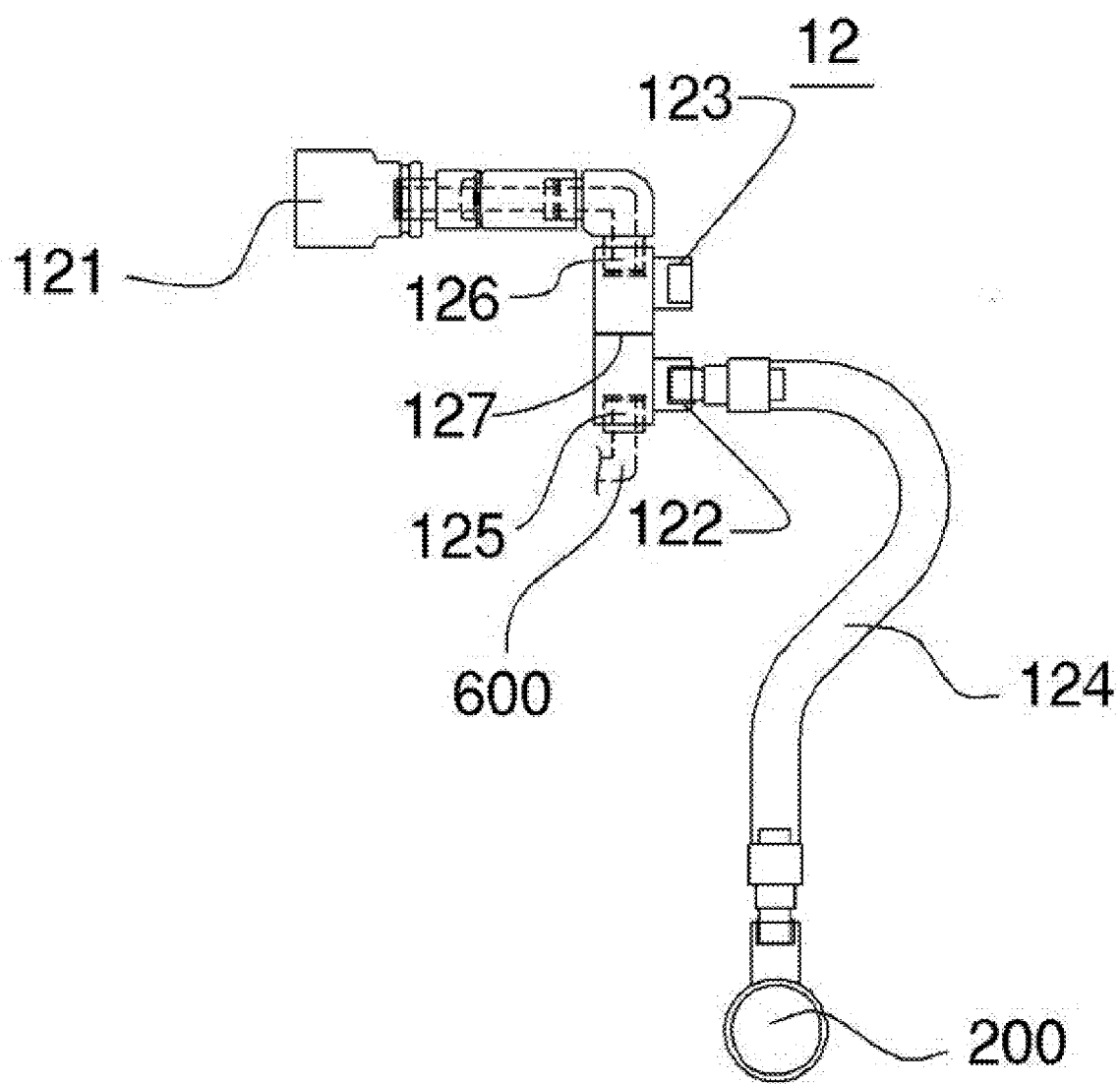
FIG. 5 is a plan view of a second coupling hose applied to the cooling circulation structure according to the embodiment.
Figure 6:
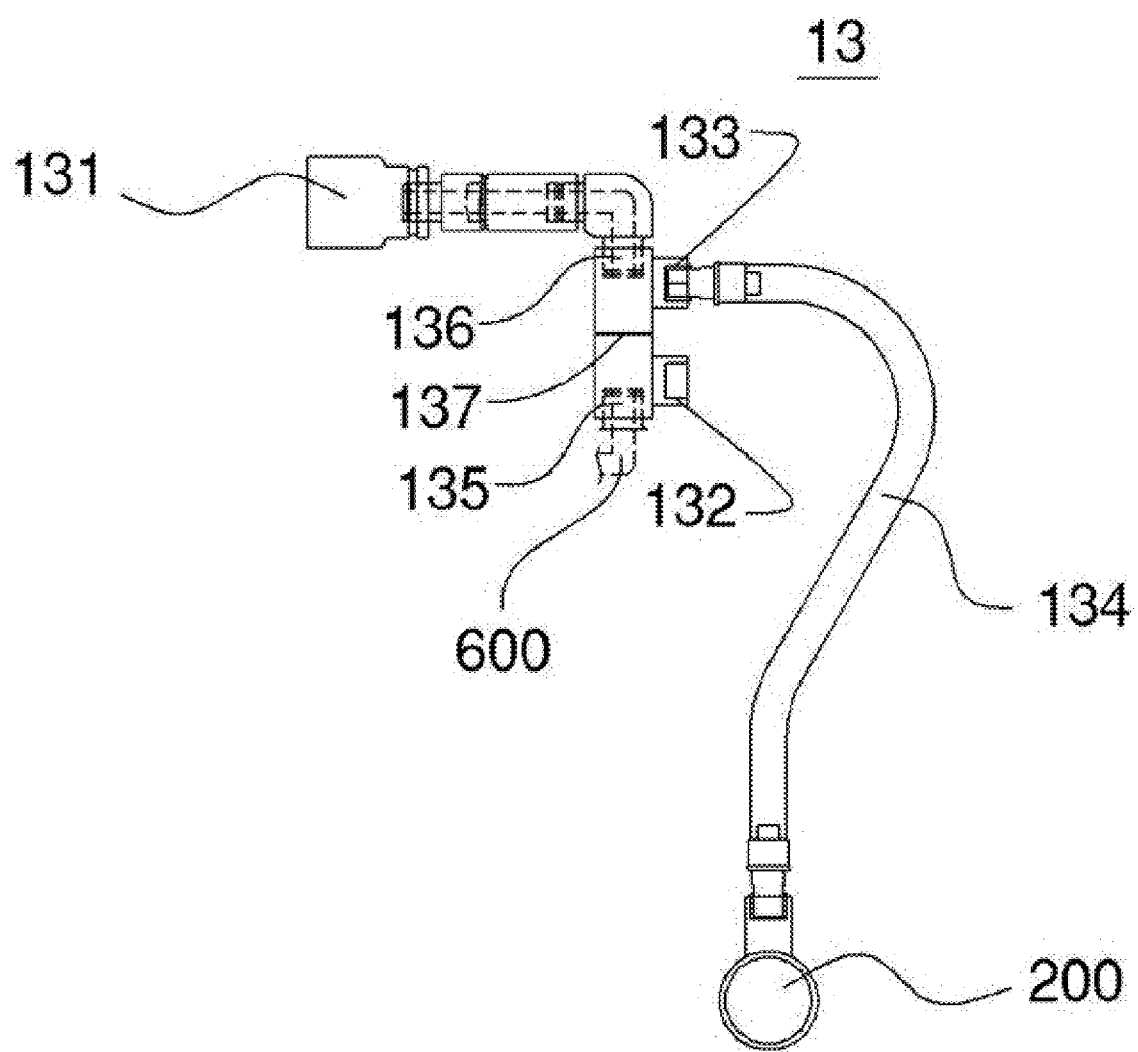
FIG. 6 is a plan view of a third coupling hose applied to the cooling circulation structure according to the embodiment.

FIG. 5 is a plan view of the second coupling hose. FIG. 6 is a plan view of the third coupling hose.

The third coupling hose 13 and the second coupling hose 12 are connected to the coolant supply ring 200 for the collector end at each end thereof to receive the coolant.

The coolant fed through the third coupling hose 13 is supplied to the lower channel 520, and the coolant fed through the second coupling hose 12 is supplied to the connector ring outer channel 600.

More specifically, as illustrated in FIG. 5, one end of the second coupling hose 12 is connected to the coolant supply ring 200 for the collector end to feed the coolant into a hose portion 124. The hose portion 124 of the second coupling hose 12 is connected to a first coupling portion 122 to feed the coolant into the inlet terminal of the connector ring outer channel 600 via a third coupling portion 125. In FIG. 5, the inlet terminal of the connector ring outer channel 600 is briefly represented by a dotted line.

As illustrated in FIG. 6, one end of the third coupling hose 13 is connected to the coolant supply ring 200 for the collector end to feed the coolant into a hose portion 134. The hose portion 134 is connected to the second coupling portions 123 and 133 to feed the coolant to the first outlet ports 121 and 131 via fourth coupling portions 126 and 136.

The first outlet ports 121 and 131 are connected to the lower channel 520 to feed the coolant into the lower channel 520.

In FIGS. 5 and 6, the first outlet port 121 of the second coupling hose 12 has the same configuration as that of the first outlet port 131 of the third coupling hose 13. Also, in FIGS. 5 and 6, the configurations of the first coupling portions 122 and 132, the second coupling portions 123 and 133, the third coupling portions 125 and 135, the fourth coupling portions 126 and 136, and blocking members 127 and 137 are equal to each other.

The blocking members 127 and 137 are interposed between the first coupling portions 122 and 132 and the second coupling portions 123 and 133, so that the coolant fed to the first coupling portions 122 and 132 is not mixed with the coolant fed to the second coupling portions 123 and 133, but flows separately to the third coupling portions 125 and 135. Similarly, the coolant fed to the second coupling portions 123 and 133 is not mixed with the coolant fed to the first coupling portions 122 and 132, but flows separately to the fourth coupling portions 126 and 136.

The expression "the first" in the first outlet ports 121 and 131 means an outlet port connected to the lower channel 520.

The second coupling hose 12 and the third coupling hose 13 are positioned to be adjacent to each other, and share the first coupling portions 122 and 132, the second coupling portions 123 and 133, the third coupling portions 125 and 135, and the blocking members 127 and 137, as described above.

Figure 7:
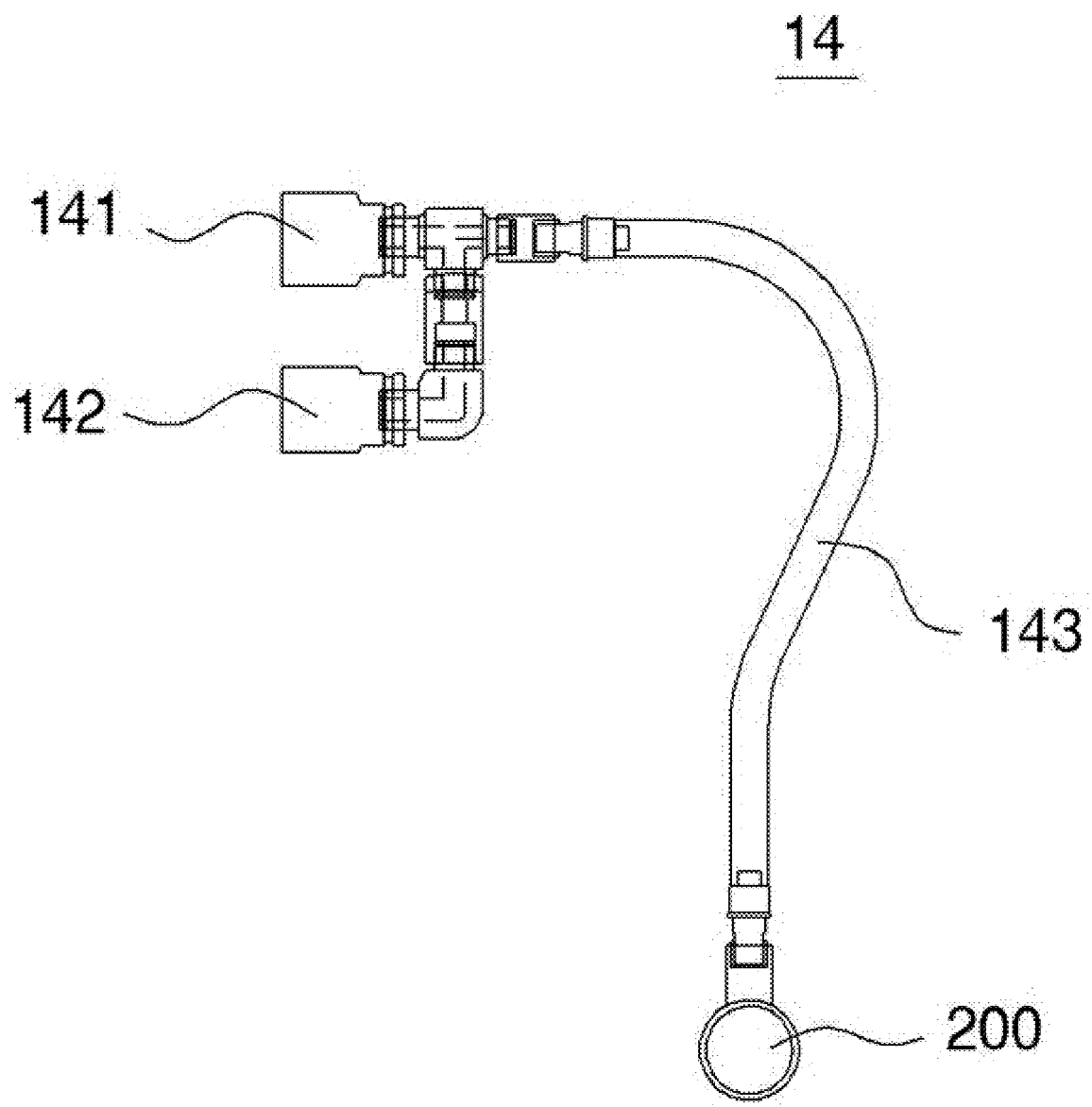
FIG. 7 is a plan view of a fourth coupling hose applied to the cooling circulation structure according to the embodiment.

FIG. 7 is a plan view of the fourth coupling hose.

As illustrated in FIG. 7, one end of the fourth coupling hose 14 is connected to the coolant supply ring 200 for the collector end to feed the coolant into a hose portion 143, and the other end is branched into a first outlet port 141 and a second outlet port 142.

The first outlet port 141 is connected to the lower channel 520 to feed the coolant into the lower channel 520, and the second outlet port 142 is connected to the upper channel 510 to feed the coolant into the upper channel 510.

As can be seen from FIG. 2, the fourth coupling hose 14 is applied to 30 locations in total, and corresponds to the most basic shape.

Figure 8:
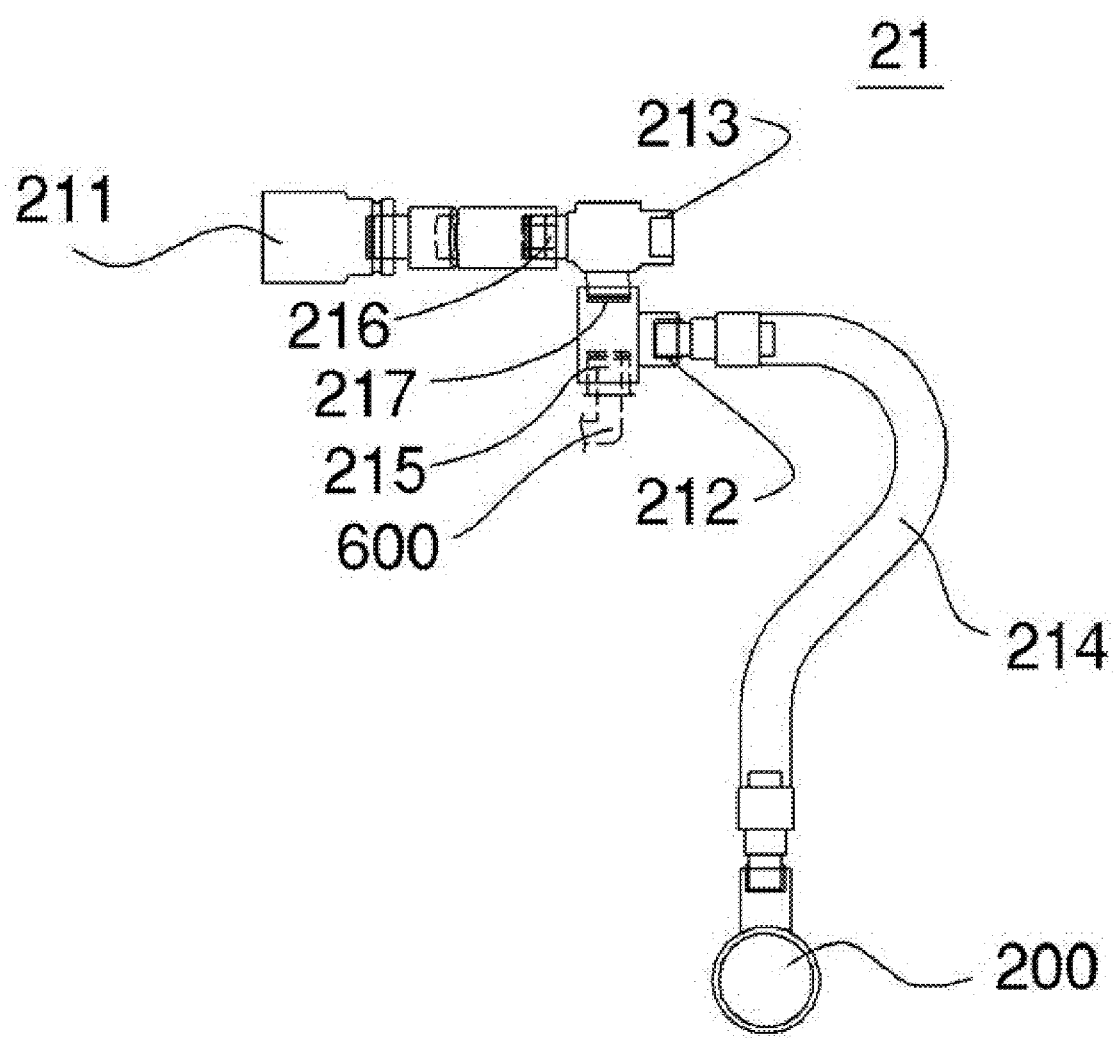
FIG. 8 is a plan view of a fifth coupling hose applied to the cooling circulation structure according to the embodiment.
Figure 9:
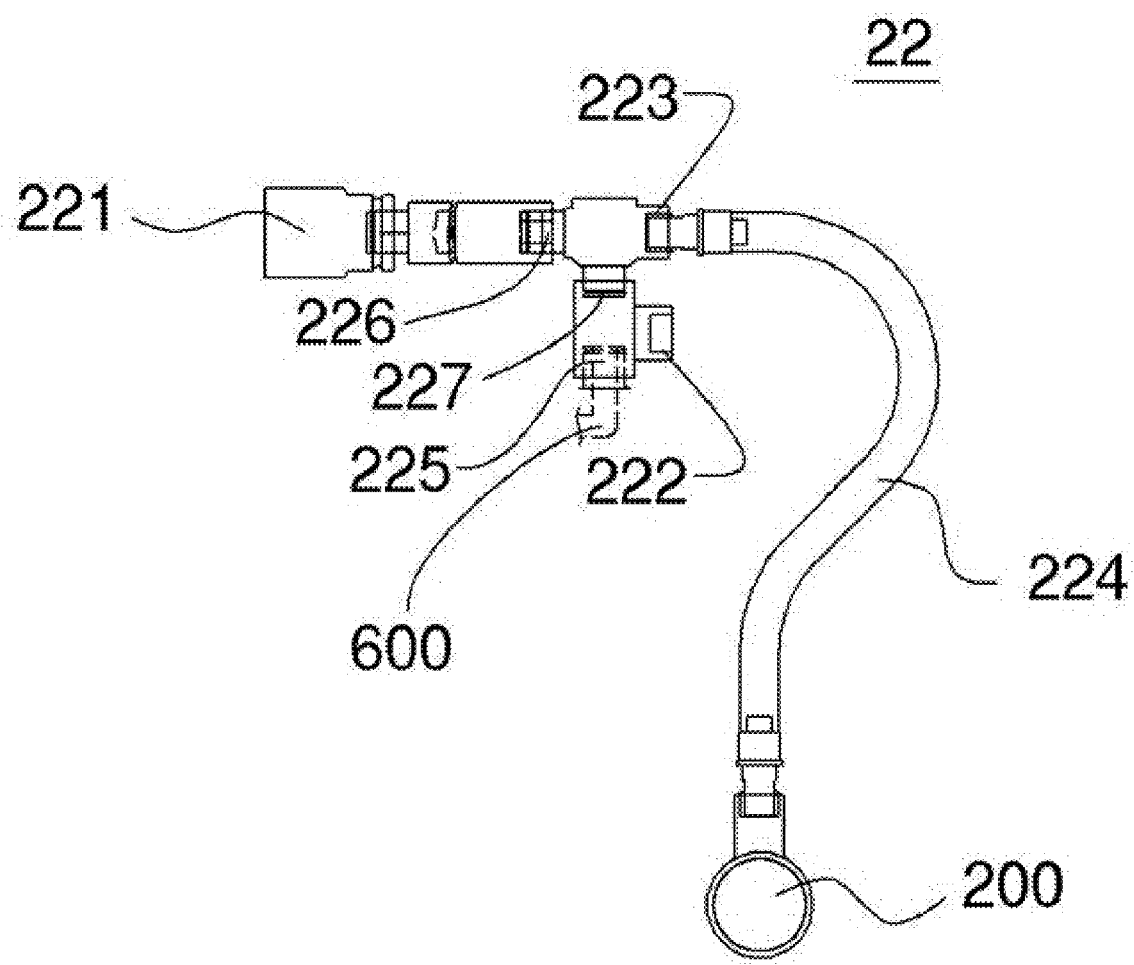
FIG. 9 is a plan view of a sixth coupling hose applied to the cooling circulation structure according to the embodiment.

FIG. 8 is a plan view of the fifth coupling hose. FIG. 9 is a plan view of the sixth coupling hose.

The fifth coupling hose 21 and the sixth coupling hose 22 are connected to the coolant supply ring 200 for the collector end at each end thereof to receive the coolant.

The coolant fed through the sixth coupling hose 22 is supplied to the upper channel 510, and the coolant fed through the fifth coupling hose 21 is supplied to the connector ring outer channel 600.

More specifically, as illustrated in FIG. 8, one end of the fifth coupling hose 21 is connected to the coolant supply ring 200 for the collector end to feed the coolant into a hose portion 214. The hose portion 214 of the fifth coupling hose 21 is connected to a first coupling portion 212 to feed the coolant into the inlet terminal of the connector ring outer channel 600 via a third coupling portion 215. In FIG. 8, the inlet terminal of the connector ring outer channel 600 is briefly represented by a dotted line.

As illustrated in FIG. 9, one end of the sixth coupling hose 22 is connected to the coolant supply ring 200 for the collector end to feed the coolant into a hose portion 224. The hose portion 224 is connected to the second coupling portions 213 and 223 to feed the coolant to the second outlet ports 211 and 221 via fourth coupling portions 216 and 226.

The second outlet ports 211 and 221 are connected to the upper channel 510 to feed the coolant into the upper channel 510.

The second outlet port 211 of the fifth coupling hose 21 in FIG. 8 has the same configuration as that of the second outlet port 221 of the sixth coupling hose 22 illustrated in FIG. 9. Also, in FIGS. 8 and 9, the configurations of the first coupling portions 212 and 222, the second coupling portions 213 and 223, the third coupling portions 215 and 225, the fourth coupling portions 216 and 226, and blocking members 217 and 227 are equal to each other.

The blocking members 217 and 227 are interposed between the first coupling portions 212 and 222 and the second coupling portions 213 and 223, so that the coolant fed to the first coupling portions 212 and 222 is not mixed with the coolant fed to the second coupling portions, but flows separately to the third coupling portions. Similarly, the coolant fed to the second coupling portions is not mixed with the coolant fed to the first coupling portions 212 and 222, but flows separately to the fourth coupling portions.

The expression "the second" in the second outlet ports means an outlet port connected to the upper channel 510.

The fifth coupling hose 21 and the sixth coupling hose 22 are positioned to be adjacent to each other, and share the first coupling portions 212 and 222, the second coupling portions 213 and 223, the third coupling portions 215 and 225, and the blocking members 217 and 227, as described above.

The third coupling hose 13 and the sixth coupling hose 22 are respectively connected to the pair of lower and upper channels 520 and 510.

In the case of the first coupling hose 11 and the fourth coupling hose 14, since the first and fourth coupling hoses 11 and 14 are provided with the first and second outlet ports, respectively, the first outlet ports 111 and 141 are respectively connected to the lower channel 520, and the second outlet ports 112 and 142 are respectively connected to the upper channel 510.

The third coupling hose 13 includes only the first outlet port 131, and the sixth coupling hose 22 includes only the second outlet port 221. In the pair of upper and lower channels 510 and 520, the first outlet port 131 of the third coupling hose 13 is connected to the lower channel 520, and the second outlet port 221 of the sixth coupling hose 22 is connected to the upper channel 510.

Figure 10:
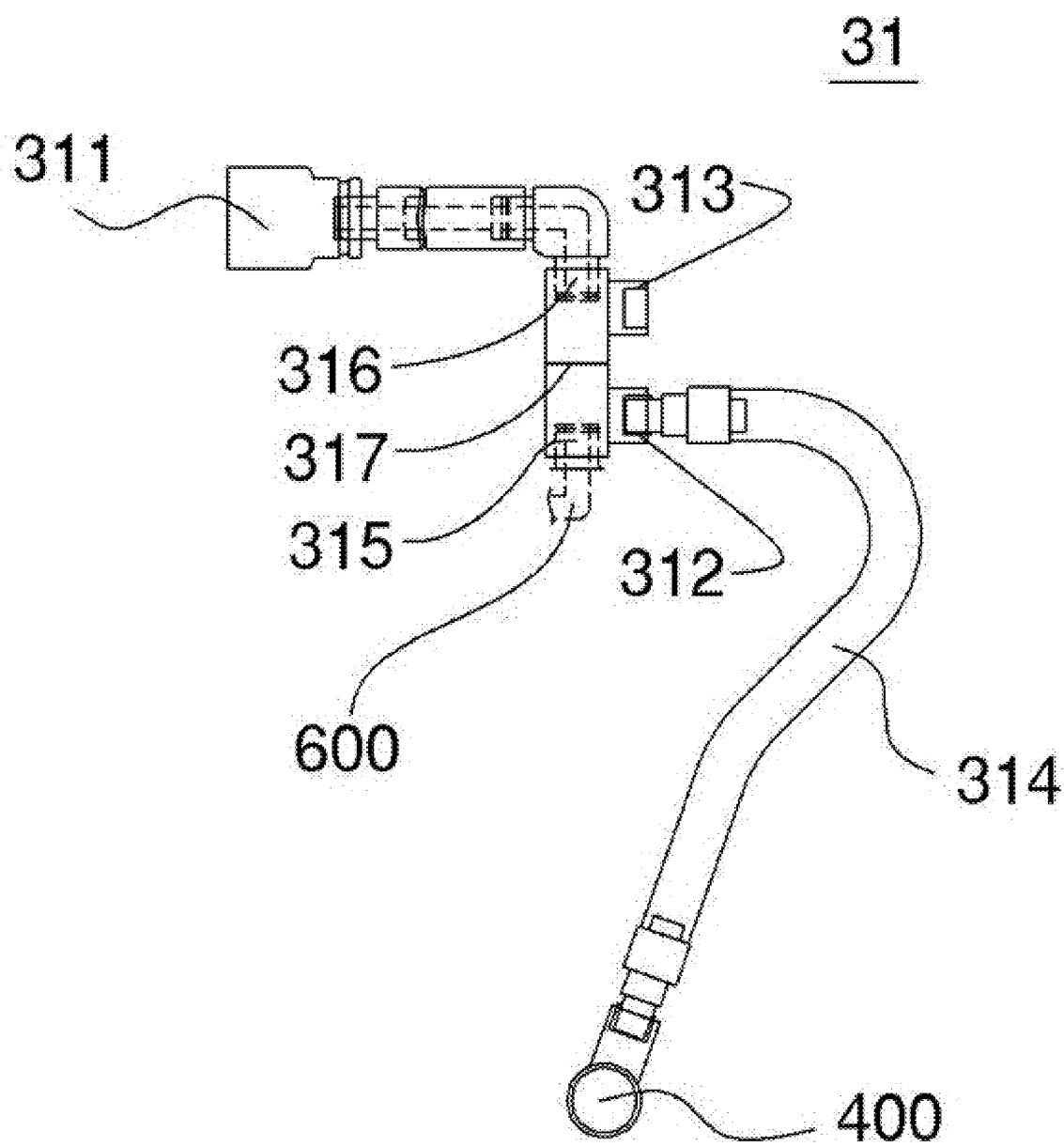
FIG. 10 is a plan view of a seventh coupling hose applied to the cooling circulation structure according to the embodiment.

FIG. 10 is a plan view of the seventh coupling hose.

The installed position of the seventh coupling hose 31 corresponds to that of the second coupling hose 12 illustrated in FIG. 5. That is, the seventh coupling hose forms a pair of coupling hoses together with the third coupling hose 13 illustrated in FIG. 6.

The seventh coupling hose 31 connects the discharge terminal of the connector ring outer channel 600 and the coolant discharge ring 400 for the collector end, as one of the third set of coupling hoses.

More specifically, the coolant flows to the seventh coupling hose 31 via a third coupling portion 315 connected to the discharge terminal of the connector ring outer channel 600. Then, the coolant flows to the hose portion 314 via the first coupling portion 312, and is discharged to the coolant discharge ring 400 for the collector end.

As illustrated in FIG. 6, one end of the third coupling hose 13 is connected to the coolant supply ring 200 for the collector end to feed the coolant into the hose portion 134. The hose portion 134 is connected to second coupling portions 133 and 313 to feed the coolant into first outlet ports 131 and 311 via fourth coupling portions 136 and 316.

The first outlet ports 131 and 311 are connected to the lower channel 520 to feed the coolant into the lower channel 520.

In FIGS. 6 and 10, the first outlet port 311 of the seventh coupling hose 31 has the same configuration as that of the first outlet port 131 of the third coupling hose 13. Also, in FIGS. 6 and 10, the configurations of the first coupling portions 132 and 312, the second coupling portions 133 and 313, the third coupling portions 135 and 315, the fourth coupling portions 136 and 316, and the blocking members 137 and 317 are equal to each other.

The blocking members 137 and 317 are interposed between the first coupling portions 132 and 312 and the second coupling portions 133 and 313, so that the coolant fed to the second coupling portions 133 and 313 is not mixed with the coolant fed to the third coupling portions 135 and 315, but flows separately to the fourth coupling portions 136 and 316. Similarly, the coolant fed to the third coupling portions 135 and 315 is not mixed with the coolant fed to the second coupling portions 133 and 313, but flows separately to the first coupling portions 132 and 312.

The expression "the first" in the first outlet ports 131 and 311 means an outlet port connected to the lower channel 520.

The seventh coupling hose 31 and the third coupling hose 13 are positioned to be adjacent to each other, and share the first coupling portions 132 and 312, the second coupling portions 133 and 313, the third coupling portions 135 and 315, and the blocking members 137 and 317, as described above.

Figure 11:
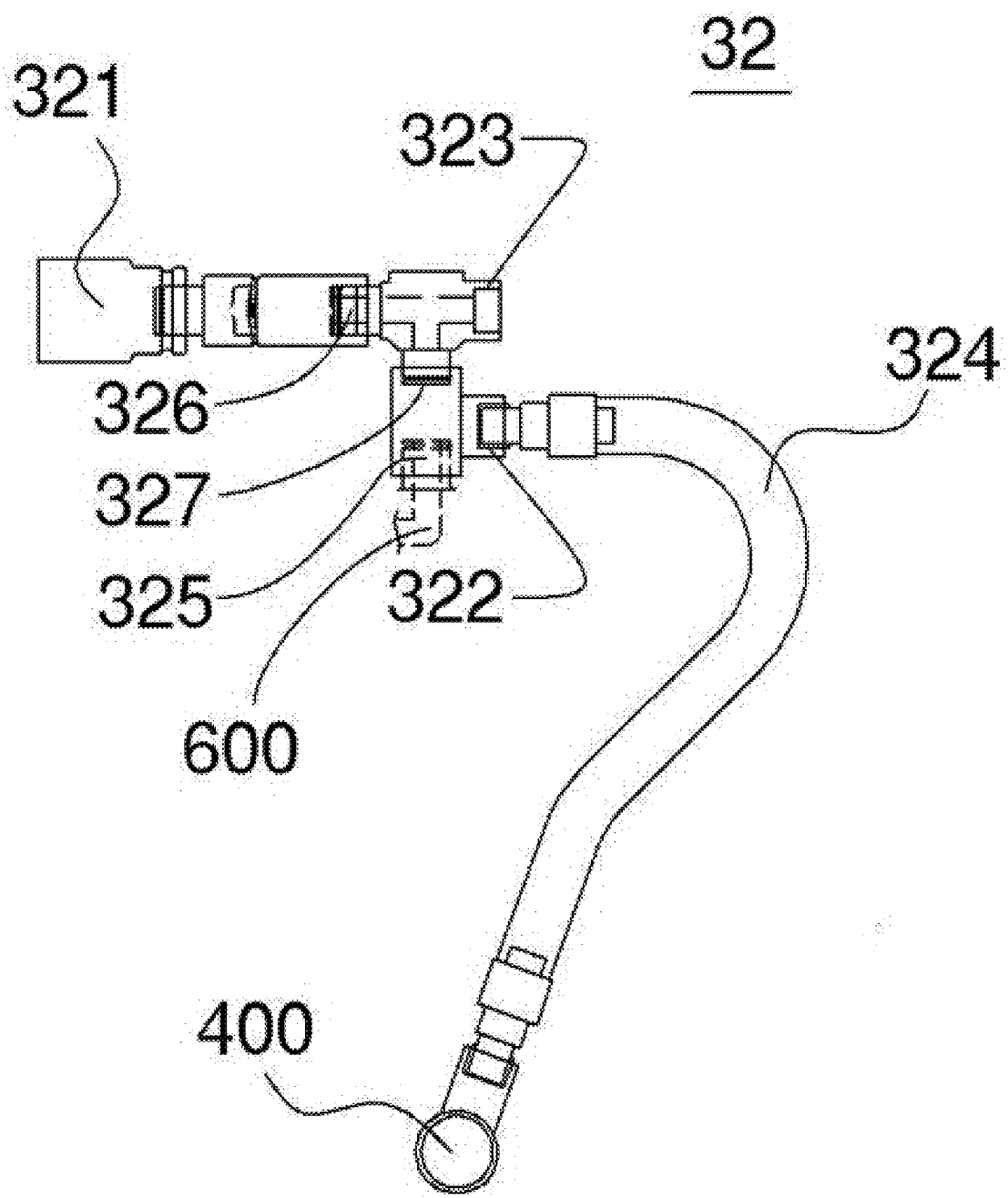
FIG. 11 is a plan view of a eighth coupling hose applied to the cooling circulation structure according to the embodiment.

FIG. 11 is a plan view of the eighth coupling hose.

The installed position of the eighth coupling hose 32 corresponds to that of the fifth coupling hose 21 illustrated in FIG. 8. That is, the eighth coupling hose 32 forms a pair of coupling hoses together with the sixth coupling hose 22 illustrated in FIG. 9.

The eighth coupling hose 32 connects the discharge terminal of the connector ring outer channel 600 and the coolant discharge ring 400 for the collector end, as one of the third set of coupling hoses.

More specifically, the coolant flows to the eighth coupling hose 32 via a third coupling portion 325 connected to the discharge terminal of the connector ring outer channel 600. Then, the coolant flows to the hose portion 324 via the first coupling portion 322, and is discharged to the coolant discharge ring 400 for the collector end.

As illustrated in FIG. 9, one end of the sixth coupling hose 22 is connected to the coolant supply ring 200 for the collector end to feed the coolant into the hose portion 224. The hose portion 224 is connected to second coupling portions 223 and 323 to feed the coolant into second outlet ports 221 and 321 via fourth coupling portions 226 and 326.

The second outlet ports 221 and 321 are connected to the upper channel 510 to feed the coolant into the upper channel 510.

In FIGS. 9 and 11, the second outlet port 321 of the eighth coupling hose 32 has the same configuration as that of the second outlet port 221 of the sixth coupling hose 22. Also, in FIGS. 9 and 11, the configurations of the first coupling portions 222 and 322, the second coupling portions 223 and 323, the third coupling portions 225 and 325, the fourth coupling portions 226 and 326, and blocking members 227 and 327 are equal to each other.

The blocking members 227 and 327 are interposed between the first coupling portions 222 and 322 and the second coupling portions 223 and 323, so that the coolant fed to the second coupling portions 223 and 323 is not mixed with the coolant fed to the third coupling portions 225 and 325, but flows separately to the fourth coupling portions 226 and 326. Similarly, the coolant fed to the third coupling portions 225 and 325 is not mixed with the coolant fed to the second coupling portions 223 and 323, but flows separately to the first coupling portions 222 and 322.

The expression "the second" in the second outlet ports 221 and 321 means an outlet port connected to the upper channel 510.

The eighth coupling hose 32 and the sixth coupling hose 22 are positioned to be adjacent to each other, and share the first coupling portions 222 and 322, the second coupling portions 223 and 323, the third coupling portions 225 and 325, and the blocking members 227 and 327, as described above.

FIG. 12 illustrates the ninth coupling hose.

The ninth coupling hose 41 is provided at the turbine end, as illustrated in FIG. 3, and serves to connect the upper and lower channels 510 and 520 and a coolant discharge ring 300 for the turbine end.

As illustrated in FIG. 12, the ninth coupling hose has a first inlet port 411 and a second inlet port 412 at one end thereof. The first inlet port 411 is connected to the end of the upper channel 510, and the second inlet port 412 is connected to the end of the lower channel 520. The ninth coupling hose is fed by the coolant through the hose portion 413, and the other end is connected to the coolant discharge ring 300 for the turbine end.

As illustrated in FIG. 3, the collector end A employs the first coupling hoses 11 to the eighth coupling hoses 32 which are different from each other, but the turbine end B employs the same ninth coupling hoses 41.

FIG. 14 is a perspective view illustrating the connector ring cooling circulation.

As illustrated in FIG. 14, according to the connector ring cooling circulation, the coolant is fed from the coolant supply ring 200 for the collector end via the second set of coupling hoses 12 and 21 to the inlet terminal of the connector ring outer channel 600. The coolant is discharged from the inlet terminal of the connector ring outer channel 600 via the third set of coupling hoses 31 and 32 to the annular coolant discharge ring 400 for the collector end.

The connector ring outer channel 600 is connected to the coolant discharge ring 400 for the collector end at the one end to receive the coolant, and corresponds to a cooling channel enclosing the circumference of the connector ring in an annular way.

The connector ring outer channel 600 is preferably provided in plural in such a way that some portions are formed in an annularly cut shape, thereby enclosing the circumference of the connector ring.

As described above, since the cooling circulation channel for the connector ring and the cooling circulation channel for the stator winding are configured as the separated circulation channel, the length of each cooling circulation channel is shortened to reduce the pump load, and improve the cooling efficiency.

Figure 15:
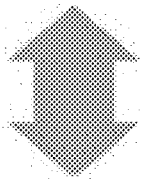
FIGS. 15 to 17 are flowcharts illustrating a separated cooling method for the water-cooled power generator according to the present disclosure.
Figure 16:
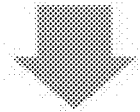
Figure 17:
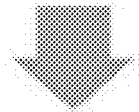

FIGS. 15 to 17 are flowcharts illustrating a method for separately cooling the water-cooled power generator according to an exemplary embodiment.

FIG. 15 shows a process of cooling the stator bar and a process of cooling the connector ring, in which a two-point arrow means that the process of cooling the stator bar and the process of cooling the connector ring are not sequentially performed, but is simultaneously performed.

FIG. 16 shows the process of cooling the stator bar in detail by dividing it into a step A and a step B, in which the step A and the step B are sequentially performed.

FIG. 17 shows the process of cooling the connector ring in detail by dividing it into a step C and a step D, in which the step C and the step D are sequentially performed.

The word "sequential" herein means that each step is sequentially executed in the flow direction of the coolant.

Hereinafter, the cooling method according to one embodiment will be described in detail with reference to FIGS. 15 to 17.

As illustrated in FIG. 15, the cooling method according to the embodiment includes a step of cooling the stator bar to cool the heat of the stator bar winding by the cooling circulation channel for the stator bar, and a step of cooling the connector ring to cool the heat of the connector ring by the cooling circulation channel for the connector ring.

The step of cooling the stator bar and the step of cooling the connector ring are carried out by the respective coolant supply paths formed by the cooling circulation channel for the connector ring and the cooling circulation channel for the stator bar which are separately provided, thereby improving the cooling efficiency and reducing the pump load.

The step of cooling the stator wiring preferably includes, as illustrated in FIG. 16, the step A of supplying the coolant from the coolant supply ring 200 for the collector end to the inlet terminal of the collector end A in the stator inner channel 500 in the stator bar, and the step B of discharging the coolant from the outlet terminal of the turbine end B in the stator inner channel 500 to the annular coolant discharge ring 300 for the turbine end.

The step of cooling the connector ring preferably includes the step C of supplying the coolant from the coolant supply ring 200 for the collector end to the inlet terminal of the connector ring outer channel 600 which annually encloses the circumference of the connector ring, and the step D of discharging the coolant from the outlet terminal of the connector ring outer channel 600 to the coolant discharge ring 400 for the collector end.

More specifically, in the step A, the coolant is supplied from the coolant supply ring 200 for the collector end to the pair of the upper channel 510 passing through the upper winding and the lower channel 520 passing through the lower winding. The upper channel 510 and the lower channel 520 form the flow of the coolant in the same direction from the collector end A to the turbine end B.

Each connection of the plurality of coupling hoses will be described in detail.

In the step A, the coolant is supplied from the coolant supply ring 200 for the collector end via at least one of the first set of coupling hoses to the inlet terminal of the stator inner channel 500.

In the step C, the coolant is supplied from the coolant supply ring 200 for the collector end via at least one of the second set of coupling hoses to the inlet terminal of the connector ring outer channel 600.

In the step D, the coolant is discharged from the outlet terminal of the connector ring outer channel 600 via at least one of the third set of coupling hoses to the coolant discharge ring 400 for the collector end.

First of all, explaining the first coupling hose 11, it will be understood that in the step A, the coolant is supplied from the coolant supply ring 200 for the collector end to one end of at least one first coupling hose 11 of the first set of coupling hoses, and then is supplied to each of the upper channel 510 and the lower channel 520 through the other end of the first coupling hose 11 which is divided into the first outlet port 111 and the second outlet port 112.

In the case of the fourth coupling hose 14, it will be understood that in the step A, the coolant is supplied from the coolant supply ring 200 for the collector end to one end of at least one fourth coupling hose 14 of the first set of coupling hoses, and then is supplied to each of the upper channel 510 and the lower channel 520 through the other end of the fourth coupling hose 14 which is divided into the first outlet port 141 and the second outlet port 142.

In the case of the second coupling hose 12 and the third coupling hose 13, it will be understood that in the step A, the coolant fed from the coolant supply ring 200 for the collector end through at least one third coupling hose 13 of the first set of coupling hoses is supplied to the lower channel 520, and in the step C, the coolant is supplied from the coolant supply ring 200 for the collector end through at least one second coupling hose 12 of the second set of coupling hoses to the connector ring outer channel 600.

In the case of the fifth coupling hose 21 and the sixth coupling hose 22, it will be understood that in the step A, the coolant fed from the coolant supply ring 200 for the collector end through at least one sixth coupling hose 22 of the first set of coupling hoses is supplied to the upper channel 510, and in the step C, the coolant is supplied from the coolant supply ring 200 for the collector end through at least one fifth coupling hose 21 of the second set of coupling hoses to the connector ring outer channel 600.

In the case of the seventh coupling hose 31 and the third coupling hose 13, it will be understood that in the step A, the coolant fed from the coolant supply ring 200 for the collector end through at least one third coupling hose 13 of the first set of coupling hoses is supplied to the lower channel 520, and in the step D, the coolant is discharged from the discharge terminal of the connector ring outer channel 600 through at least one seventh coupling hose 31 of the third set of coupling hoses to the coolant discharge ring 400 for the collector end.

In the case of the eighth coupling hose 32 and the sixth coupling hose 22, it will be understood that in the step A, the coolant fed from the coolant supply ring 200 for the collector end through at least one sixth coupling hose 22 of the first set of coupling hoses is supplied to the upper channel 510, and in the step D, the coolant is discharged from the discharge terminal of the connector ring outer channel 600 through at least one eighth coupling hose 31 of the third set of coupling hoses to the coolant discharge ring 400 for the collector end.

In the step B, the coolant fed is discharged from the coolant discharge ring 300 for the turbine end through the plurality of ninth coupling hoses 41 which are connected to the outlet terminals of the upper and lower channels 510 and 520 of the stator inner channel 500. One end of the ninth coupling hose 41 is divided into the first inlet port 411 and the second inlet port 412 to receive the coolant from the upper channel 510 and the lower channel 520, and the other end is connected to the coolant discharge ring 300 for the turbine end to discharge the coolant.

It is to be noted that technical terms used in this specification are used to describe only specific embodiments and are not intended to limit the present invention. Furthermore, the technical terms used in this specification should be construed as having meanings that are commonly understood by those skilled in the art to which the present disclosure pertains unless especially defined as different meanings otherwise in this specification, and should not be construed as having excessively comprehensive meanings or excessively reduced meanings. Furthermore, if the technical terms used in this specification are wrong technical terms that do not precisely represent the spirit of the present disclosure, they should be replaced with technical terms that may be correctly understood by those skilled in the art and understood. Furthermore, common terms used in the specification should be interpreted in accordance with the definition of dictionaries or in accordance with the context, and should not be construed as having excessively reduced meanings.

Furthermore, an expression of the singular number used in this specification includes an expression of the plural number unless clearly defined otherwise in the context. In this application, terms, such as "comprise" and "include", should not be construed as essentially including all several elements or several steps described in the specification, but the terms may be construed as not including some of the elements or steps or as including additional element or steps.

Those skilled in the art may change and modify the present invention in various ways without departing from the essential characteristic of the present invention. Accordingly, the disclosed embodiments should not be construed as limiting the technical spirit of the present disclosure, but should be construed as illustrating the technical spirit of the present disclosure. The scope of the technical spirit of the present disclosure is not restricted by the embodiments, and the scope of the present invention should be interpreted based on the following appended claims. Accordingly, the present invention should be construed as covering all modifications or variations derived from the meaning and scope of the appended claims and their equivalents.

What is claimed is:
1. A separated coolant circulation structure for a water-cooled power generator, comprising:
    a cooling circulation channel for a stator bar including a first coolant supply path that is configured to cool heat of a stator bar winding; and
    a cooling circulation channel for a connector ring including a second coolant supply path that is configured to cool heat of a connector ring,
    wherein the first coolant supply path is separated from the second coolant supply path, the first coolant supply path is connected to a first coolant discharge ring, and the second coolant supply path is connected to a second coolant discharge ring to improve cooling efficiency and reduce a pump load.

2. The separated coolant circulation structure according to claim 1, wherein the cooling circulation channel for the stator bar includes an annular coolant supply ring for a collector end which is connected to a coolant inlet pipe, through which a coolant flows;
a stator inner channel for supplying the coolant to the stator winding, of which an inlet terminal positioned at a collector end side is connected to the coolant supply ring for the collector end; and
an annular coolant discharge ring for a turbine end configured as the first coolant discharge ring and connected to an outlet terminal of a turbine end side of the stator inner channel.

3. The separated coolant circulation structure according to claim 2, wherein the stator inner channel includes an upper channel passing an upper winding and a lower channel passing a lower winding, and
the upper channel and the lower channel respectively form a flow of the coolant in the same direction from the collector end side to the turbine end side.

4. The separated coolant circulation structure according to claim 3, wherein the cooling circulation channel for the connector ring includes the coolant supply ring for the collector end,
a connector ring outer channel for annually enclosing a circumference of the connector ring, of which an inlet terminal is connected to the coolant supply ring for the collector end to receive the coolant, and
an annular coolant discharge ring for the collector end configured as the second coolant discharge ring and connected to an outlet terminal of the connector ring outer channel.

5. The separated coolant circulation structure according to claim 4, wherein an inlet terminal of the stator inner channel is connected to the coolant supply ring for the collector end by at least one of a first set of coupling hoses,
an inlet terminal of the connector ring outer channel is connected to the coolant supply ring for the collector end by at least one of a second set of coupling hoses, and
an outer terminal end of the connector ring outer channel is connected to the coolant discharge ring for the collector end by at least one of a third set of coupling hoses.

6. The separated coolant circulation structure according to claim 5, wherein the first set of coupling hoses includes at least one first coupling hose, of which one end is connected to the coolant supply ring for the collector end to receive the coolant, and the other end is branched into a first outlet port and a second outlet port, and
the first outlet port and the second outlet port are respectively connected to the lower channel and the upper channel to feed the coolant into the lower and upper channels.

7. The separated coolant circulation structure according to claim 5, wherein the first set of coupling hoses includes at least one fourth coupling hose, of which one end is connected to the coolant supply ring for the collector end to receive the coolant, and the other end is branched into a first outlet port and a second outlet port, and
the first outlet port and the second outlet port are respectively connected to the lower channel and the upper channel to feed the coolant into the lower and upper channels.

8. The separated coolant circulation structure according to claim 5, wherein the first set of coupling hoses includes at least one third coupling hose,
the second set of coupling hoses includes at least one second coupling hose,
the third coupling hose and the second coupling hose are connected to the coolant supply ring for the collector end at each end to receive the coolant,
the coolant fed through the third coupling hose is supplied to the lower channel, and
the coolant fed through the second coupling hose is supplied to the connector ring outer channel.

9. The separated coolant circulation structure according to claim 5, wherein the first set of coupling hoses includes at least one sixth coupling hose,
the second set of coupling hoses includes at least one fifth coupling hose,
the fifth coupling hose and the sixth coupling hose are connected to the coolant supply ring for the collector end at each end to receive the coolant,
the coolant fed through the sixth coupling hose is supplied to the upper channel, and
the coolant fed through the fifth coupling hose is supplied to the connector ring outer channel.

10. The separated coolant circulation structure according to claim 5, wherein the first set of coupling hoses includes at least one third coupling hose;
the third set of coupling hoses includes at least one seventh coupling hose;
one end of the third coupling hose is connected to the coolant supply ring for the collector end to receive the coolant from the coolant supply ring for the collector end, and the other end is connected to the lower channel to supply the coolant to the lower channel; and
one end of the seventh coupling hose is connected to the outlet terminal of the connector ring outer channel to receive the coolant from the connector ring outer channel, and the other end is connected to the coolant discharge ring for the collector end to discharge the coolant to the coolant discharge ring for the collector end.

11. The separated coolant circulation structure according to claim 5, wherein the first set of coupling hoses includes at least one sixth coupling hose;
the third set of coupling hoses includes at least one eighth coupling hose;
one end of the eighth coupling hose is connected to the coolant supply ring for the collector end to receive the coolant from the coolant supply ring for the collector end, and the other end is connected to the upper channel to supply the coolant to the upper channel; and
one end of the eighth coupling hose is connected to the outlet terminal of the connector ring outer channel to receive the coolant from the connector ring outer channel, and the other end is connected to the coolant discharge ring for the collector end to discharge the coolant to the coolant discharge ring for the collector end.

12. The separated coolant circulation structure according to claim 5, wherein the connector ring outer channel is provided in plural in such a way that some portions are formed in an annularly cut shape, thereby enclosing the circumference of the connector ring,
each inlet terminal of the connector ring outer channels is connected to the coolant supply ring for the collector end by the second set of coupling hoses to receive the coolant, and each outlet terminal is connected to the coolant discharge ring for the collector end by the third set of coupling hose to discharge the coolant.

13. The separated coolant circulation structure according to claim 3, wherein an outlet terminal of the stator inner channel at the turbine end side of the upper and lower channels is connected to the coolant discharge ring for the turbine end by the plurality of ninth coupling hoses, one end of the ninth coupling hose is divided to a first inlet port and a second inlet port which receive the coolant from the upper and lower channels, respectively, and the other end is connected to the coolant discharge ring for the turbine end in the shape of a single outlet to discharge the coolant.

14. A method of separately cooling a water-cooled power generator, comprising:

cooling heat of a stator winding by a cooling circulation channel for the stator winding that includes a first coolant supply path;

cooling heat of a connector ring by a cooling circulation channel for the connector ring that includes a second coolant supply path, wherein, the step of cooling the stator winding includes supplying a coolant through the first coolant supply path to the first coolant discharge ring and the step of cooling the connector ring includes supplying the coolant through the second coolant supply path, separated from the first coolant supply path, to a second coolant discharge ring, thereby improving cooling efficiency and reducing a pump load.

15. The method of separately cooling the water-cooled power generator according to claim 14, wherein the step of cooling the stator wiring includes a step A of supplying the coolant from a coolant supply ring for a collector end to an inlet terminal of the collector end in a stator inner channel in a stator bar, and a step B of discharging the coolant from an outlet terminal of a turbine end in the stator inner channel to an annular coolant discharge ring for a turbine end configured as the first coolant discharge ring.

16. The method of separately cooling the water-cooled power generator according to claim 15, wherein the step of cooling the connector ring includes a step C of supplying the coolant from the coolant supply ring for the collector end to an inlet terminal of a connector ring outer channel which annually encloses the circumference of the connector ring, and a step D of discharging the coolant from the outlet terminal of the connector ring outer channel to a coolant discharge ring for the collector end configured as the second coolant discharge ring.

17. The method of separately cooling the water-cooled power generator according to claim 15, wherein in the step A, the coolant is supplied from the coolant supply ring for the collector end to a pair of an upper channel passing through an upper winding and a lower channel passing through a lower winding, and the upper channel and the lower channel form a flow of the coolant in the same direction from the collector end to the turbine end.

18. The method of separately cooling the water-cooled power generator according to claim 16, wherein in the step A, the coolant is supplied from the coolant supply ring for the collector end via at least one of a first set of coupling hoses to the inlet terminal of the stator inner channel, in the step C, the coolant is supplied from the coolant supply ring for the collector end via at least one of a second set of coupling hoses to the inlet terminal of the connector ring outer channel, and in the step D, the coolant is discharged from the outlet terminal of the connector ring outer channel via at least one of a third set of coupling hoses to the coolant discharge ring for the collector end.

19. The method of separately cooling the water-cooled power generator according to claim 18, wherein in the step A, the coolant is supplied from the coolant supply ring for the collector end to one end of at least one first coupling hose of the first set of coupling hoses, and then is supplied to each of the upper channel and the lower channel through the other end of the first coupling hose which is divided into a first outlet port and a second outlet port.

20. The method of separately cooling the water-cooled power generator according to claim 18, wherein in the step A, the coolant is supplied from the coolant supply ring for the collector end to one end of at least one fourth coupling hose of the first set of coupling hoses, and then is supplied to each of the upper channel and the lower channel through the other end of the fourth coupling hose which is divided into a first outlet port and a second outlet port.

* * * * *